US006245312B1

(12) United States Patent
Blank et al.

(10) Patent No.: US 6,245,312 B1
(45) Date of Patent: Jun. 12, 2001

(54) SUPERHARD CARBON MATERIAL, A METHOD FOR ITS PRODUCTION, AND ARTICLES MADE THEREFROM

(75) Inventors: Vladimir Davidovich Blank; Serjei Gennadievich Buga; Gennady Aleksandrovich Dubitsky; Nadejda Ruvimovna Serebryanaya; Mikhail Yurievich Popov, all of Moscow (RU)

(73) Assignee: Ministry for Sciene & Technology of Russia: Center f Superhard Materials (RU)

( * ) Notice: Subject to any disclaimer, the term of this patent is extended or adjusted under 35 U.S.C. 154(b) by 0 days.

(21) Appl. No.: 09/284,375

(22) PCT Filed: Oct. 10, 1997

(86) PCT No.: PCT/IB97/01575

§ 371 Date: Jun. 21, 1999

§ 102(e) Date: Jun. 21, 1999

(87) PCT Pub. No.: WO98/16465

PCT Pub. Date: Apr. 23, 1998

(30) Foreign Application Priority Data

Oct. 11, 1996 (RU) ................................. 96120230

(51) Int. Cl.[7] .................................................. C01B 31/02
(52) U.S. Cl. ................................. 423/445 B; 423/445 R; 428/408
(58) Field of Search ........................... 423/445 R, 445 B, 423/446, 460; 428/408

(56) References Cited

U.S. PATENT DOCUMENTS 5,360,477 * 11/1994 Inoue ....................................... 117/4

FOREIGN PATENT DOCUMENTS 8-217429 * 8/1996 (JP) .

OTHER PUBLICATIONS

Kozlov, ME, et al. "Superhard form of Carbon obtained from C60 . . . ", Synthetic Metals, vol. 70, pp. 1411–1412, Jul. 1995.*

Ma, Y. et al. "Conversion of Fullerenes to Diamonds under . . . high temperature". Applied Physics Letters, vol. 65, #7, pp. 822–823, Aug. 1994.*

Iwasa, et al. "New Phases of C60 Synthesized at High Pressure", Science, vol. 264, pp. 1570–1572, Jun. 1994.*

Brown, et al. "Gap Reduction and Collapse of Solid C60 . . . ", Phys. Rev. Lett., vol. 69, #20, pp. 466–469, Jul. 1992.*

Blank, et al. "Is C60 Fullereite Harder than Diamond?" Phys. Letters A, pp. 281–286, May 1994.*

Blank et al. "Phase Transformations in Solid C60 . . . polymerized Fullereites". Phys. Lett. A., pp. 149–157, Sep. 1996.*

Kozlov, et al. "Transformation of C60 fullerenes . . . " Applied Physics Lett., vol. 66, #10, pp. 1199–1201, Mar. 1995.*

Davydov, et al. "Transformation of C60 Fullereite at 9.5 GPa". Electrochem. Soc. Proc., vol. 95–10, pp. 964–972, May 1994.*

Blank et al. "Synthesis of Ultrahard . . . Materials from C60 Fullerite". Molecular Materials, pp. 251–256, vol. 7, #1, Jun. 1995.*

Blank, et al. "Physical Properties of Superhard abd Ultrahard Fullerites Created from Solid C60 . . . " Applied Physics A, vol. 64, pp. 247–250, Mar. 1997.*

Blank, Et al. "Manufacturing of Superhard and Ultrahard materials from C60 Fullerite: Extremely Low Heat Capacity of Dense Amorphous Fullerites". Proceeding of the International Winterschool on Electronic Properties of Novel Materials, 1996 in Singapore, Feb. 1996.*

* cited by examiner

Primary Examiner—Stuart L. Hendrickson

(57) ABSTRACT

The present invention is concerned with a superhard carbon material having a structure comprising structural elements, in the form of tetrahedrons, with groups of carbon atoms in their apices. It is also concerned with a method for producing the superhard carbon material from fullerite $C_{60}$, having in its structure structural elements in the form of tetrahedrons, by polymerization of the fullerite $C_{60}$ until in the structure of the target material the bulk-polymerized structural elements in the form of tetrahedrons are formed containing in their apices groups of carbon atoms. Articles made of the new superhard carbon material are also claimed.

19 Claims, 13 Drawing Sheets

Figure 1:
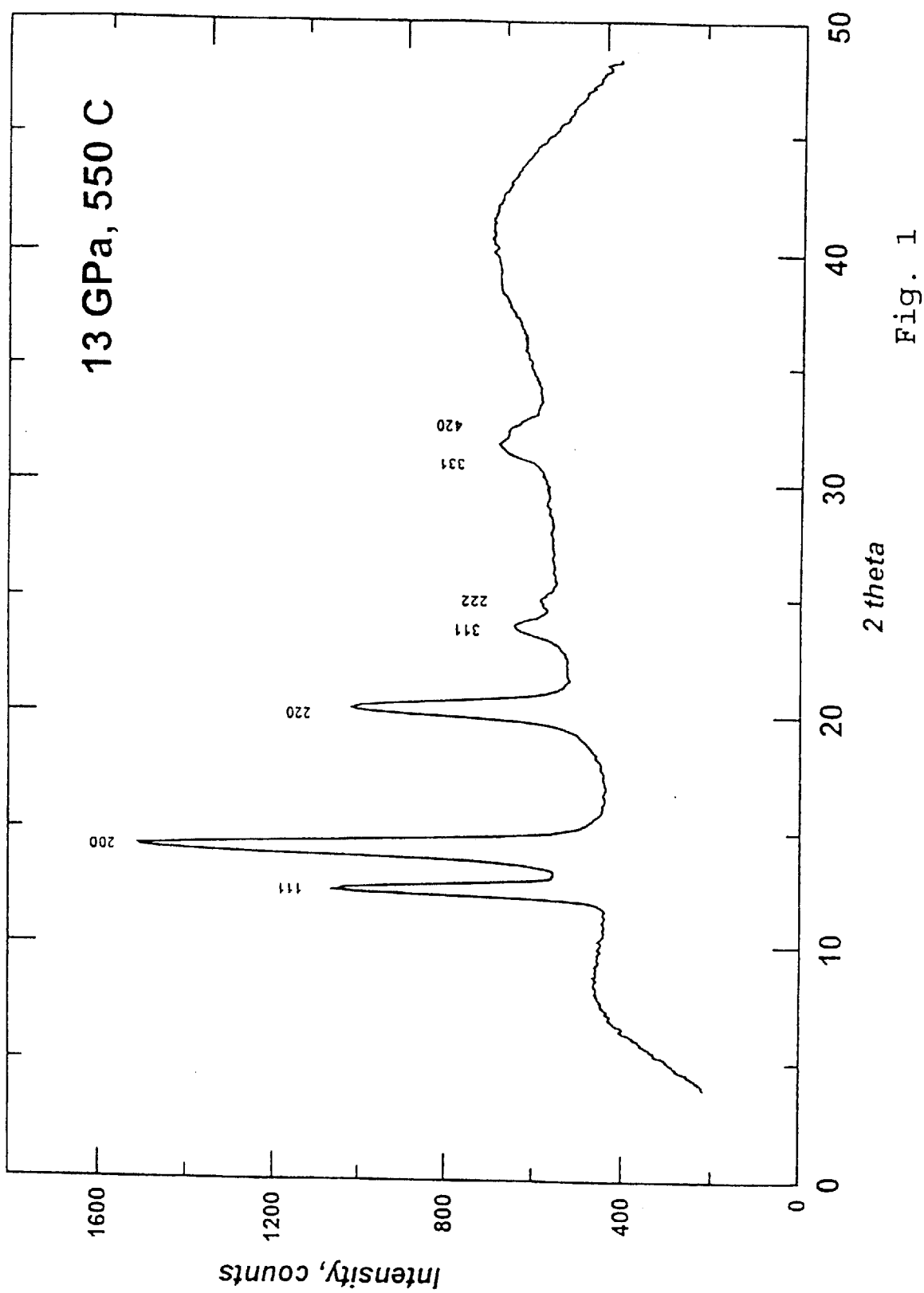

SUPERHARD CARBON MATERIAL, A METHOD FOR ITS PRODUCTION, AND ARTICLES MADE THEREFROM

The present invention is concerned with materials technology, and in particular with the synthesis of superhard materials, especially superhard carbon material. The present invention is also concerned with a method for producing such superhard carbon material and articles made therefrom.

The superhard carbon material of the present invention can be used as instrumental, construction and semiconductor material, as devices and articles made of it as well as in metal working, the working of natural stone, of any other hard and superhard materials as well as in electronics.

Diamond, a natural polymer consisting of carbon, is known as the hardest material. Artificial superhard materials based on carbon, like diamond and lonsdalite (hexagonal diamond) have a hardness comparable with that of natural diamond (U.S. Pat. No. 3.488.153, Int. Cl. C01b 31/06, 1970). Superhard materials based on boron and nitrogen are also known, e.g. the cubic and wurtzite modification of boron nitride with a hardness approaching the hardness of diamond (A. V. Kurdyumov, A. N. Pilyankevich, "Fazovye prevrashcheniya v uglerode i nitride bora" (Phase Transformations in Carbon and Boron Nitride), Kiev: Naukova Dumka, 1979).

The structure of diamond and lonsdalite, as well as that of cubic (BNk) and wurtzite boron nitride (BNb) is based on coordination tetrahedrons, the apices of which in the diamond structures are occupied by carbon atoms and in the aforesaid modifications of boron nitride with boron and nitrogen. In an ideal crystal lattice of diamond the tetrahedrons are regular, the volume is 1.87 $Å^3$, all four bonds are equal in length and the angles between the bonds are 109.47°, each. In the cubic structural modifications of these materials the bulk-polymerized tetrahedrons form layers in which they are in the state of identical orientation. In hexagonal structural modifications (lonsdalite, wurtzite boron nitride) the tetrahedrons of each subsequent layer are turned by 60° with respect to the tetrahedrons of the underlying layer. The tetrahedrons are interconnected, thereby forming a three-dimensional polymeric structure of carbon atoms. In tetrahedrons of diamond and lonsdalite the lengths of all four bonds are equal to 1.54 Å. The parameter of the unit cell of diamond is a=3.56 Å and the cell contains 8 carbon atoms.

Being the hardest material in comparison with other known materials (10 units according the Mohs' scale), diamond has a low electric conductivity (the width of the forbidden zone in pure crystals is 5.6 eV and the specific conductivity sigma<$10^{-9}$ $ohm^{-1} \times cm^{-1}$). Diamond is chemically stable in aggressive media. An increase in electric conductivity by several orders of magnitude may be obtained only by applying special doping methods.

The main trends in obtaining diamonds and lonsdalite are:
(1) extraction from natural sources;
(2) synthesis from carbonic materials by various kinds of processings.

There are methods to synthesize diamond and lonsdalite by direct transformation of carbonic substances, mainly various kinds of graphite, at high pressure and temperature without catalytic solvents (U.S. Pat. No. 3,488,153). Diamond is also obtained by "Catalytic synthesis", i.e. by addition of special substances to carbonic materials. Besides, lonsdalite excavated from natural sources and lonsdalite obtained by synthesis without catalysts exists in the samples mainly in strong combination with diamond and it is not possible to separate it.

To carry out the known methods of producing diamond by direct transformation a static pressure of not lower than 13 GPa and a temperature of not lower than 1600° C. is required. Thus, these methods are inefficient because the devices for this range of pressures have a small volume and a low stability. In catalytic synthesis diamonds are obtained mainly as powders and monocrystals which in the course of their growth entrap atoms of catalytic solvents, thereby deteriorating the properties. During the synthesis the catalytic solvents bind a part of the initial or starting carbonic material resulting in by-products which decrease the output of diamond and requires labor-consuming operations for their extraction and removal. A method for producing compact polycrystalline diamond using diamond powder without binding agents is of little use for the applied purposes, because diamond powder poorly cakes and the quality of the final product does not meet the requirements. The solids obtained with binding agents and catalysts have lower thermostability and the field of their application is thus reduced.

Currently a new allotropic form of carbon is described—fulleren—that is used as a starting material in diamond production ("The Fullerens", edited by H. W. Kroto, J. E. Fischer, D. E. Cox, Oxford, New York, Seoul, Tokyo: Pergamon Press, 1993).

Fulleren is a molecule in which carbon atoms (60–240 and more) are bound in such a way that they form a hollow subspherical body. Thus, e.g. the molecule of fulleren $C_{60}$ is similar to a football. It is formed of 20 hexagons and 12 pentagons. The interatomic distances in the fulleren $C_{60}$ molecule are as short as in graphite, and the molecule diameter is about 0.65 nm.

Fullerite is a material based on fulleren molecules. The structure of the initial fullerite $C_{60}$ may be represented as a recurrent pattern of tetrahedrons containing molecules of fullerite $C_{60}$ in their apices. The volume of the tetrahedrons of the initial fullerite $C_{60}$ is about 119 $Å^3$.

It is known that various kinds of fullerites are used in the manufacture of artificial diamonds at high nonhydrostatic pressure using "anvil" chambers (FR 2,684,090 F1, C01D 31/06, B01J 3/06, 1991). The powder of the initial fullerite—a mixture of $C_{60}$-$C_{70}$ fullerite—is introduced into the central hole of a gasket of pyrophyllite that is placed on an "anvil" of the apparatus. Being exposed to a pressure of 20±5 GPa at a rate of 1 GPa/minute and at room temperature and as a result of a high shearing strain the initial fullerite decomposes at the molecular level yielding free amorphous carbon. Under the same conditions the formed amorphous carbon is transformed into a shiny transparent mass. X-ray diffraction has demonstrated that the formed final product is a polycrystalline diamond. Thus, this document describes the transformation of fullerites under high pressure into a known product—diamond, the properties of which are described above. This method is characterized by parameters that are typical of direct methods of transformation of carbonic substances into diamond. In this document it is said that the value of the lower level of the range may be 15 GPa, however under such conditions the output of the target product is low.

At present, in various fields of technology and industry materials are required having a hardness surpassing the hardness of diamond, e.g., for efficient working of hard, churlish alloys, and of diamond itself and instruments based on diamond, lonsdalite, cubic and wurtzite boron nitride. There is also a need for materials combining a high hardness with a high electric conductivity or semiconductor properties and possessing a considerable chemical inertness that is necessary, e.g., for construction of elements of electronic apparatuses and devices.

The present invention claims the creation of a superhard carbon material having such properties and a method for its production under conditions yielding a new superhard carbon material having a hardness at a level that is comparable with the hardness of known superhard materials and is even surpassing this level, possessing improved electric conductivity, thus permitting to produce articles with a hardness of about 170 GPa and an electric conductivity of about 1 $ohm^{-1}$ $cm^{-1}$.

The new carbon material, the structure of which includes bulk-polymerized structural elements in the form of tetrahedrons solves this task. According to the present invention, the aforesaid structural elements in the form of tetrahedrons contain groups of carbon atoms in their apices. According to the claimed invention the new carbon material has a hardness meeting and surpassing 170 GPa and an electric conductivity of $10^{-6}$–$10^2$ $ohm^{-1}$ $cm^{-1}$.

The superhard carbon material of the present invention has a structure including bulk-polymerized structural elements in the form of tetrahedrons, wherein that structural elements in the form of tetrahedrons contain in their apices groups of carbon atoms and has a hardness of at least 160 GPa and an electric conductivity of $10^{-6}$–$10^2$ $ohm^{-1}$ $cm^{-1}$.

In a preferred embodiment of the present invention the groups of carbon atoms are spatially closed formations of the fulleren type.

In another preferred embodiment of the present invention the groups of carbon atoms have the appearance of fulleren $C_{60}$ molecules and furthermore preferable the superhard carbon material mainly has a crystalline structure in which the structural elements, as tetrahedrons, exist in a significantly ordered orientation.

The material having a crystalline structure shows an anisotropy of the physical properties which is important in the aspect of optoelectronics, acoustoelectronics and other applications. In addition, the presence of certain types of crystalline structures allows the standardization of these new superhard carbon materials.

In a further preferred embodiment of the present invention the new superhard carbon material has an amorphous structure in which the structural elements in the form of tetrahedrons are in the state of disordered orientation. The amorphous character of the material results in isotropic mechanical properties. These properties are a big advantage in comparison with crystalline diamond in some technological applications connected with high impact spalling loads.

A still further preferred embodiment of the present invention the structure of the new superhard carbon material contains structural elements in the form of tetrahedrons in the state of ordered orientation and structural elements in the form of tetrahedrons in the state of disordered orientation. The presence of an amorphous component in the structure of the material decreases anisotropy of its physical properties, which is an important condition for technological applications, in which the presence of sliding surfaces in such a structure as for example diamond, deteriorates its performance.

The present invention recommends to obtain the new superhard material by a method that comprises the polymerization of the starting fullerite $C_{60}$ containing in its structure tetrahedron elements to a target material in which according to the present invention polymerization is carried out until the formation of bulk-polymerized structural elements in the form of tetrahedrons, containing in their apices the groups of carbon atoms, appears in the structure of the target material.

Due to the present invention it is possible to obtain a new carbon material having a hardness of 50–170 GPa and higher and an electric conductivity of $10^{-6}$–$10^2$ $ohm^{-1}$ $cm^{-1}$.

To ensure a pure elemental composition of the target product and the exclusion of a chemical purification step and in order to provide chemical purity of the final product it is advisable, and this is an object of the present invention, to perform the polymerization of the starting fullerite $C_{60}$ under non-catalytic conditions.

To ensure 100% output of the product with the claimed characteristics it is advisable, and this is an further object of the present invention, to perform the said polymerization of the starting fullerite $C_{60}$ at pressure and temperature that allow a formation of bulk-polymerized structural elements in the form of tetrahedrons containing in their apices groups of carbon atoms in the structure of the target material.

To decrease the threshold values of pressure and temperature in producing the target product it is advisable, and this is a still further object of the present invention, to apply during polymerization of the starting fullerite $C_{60}$ a process of shearing strain, however excluding destruction of structural elements.

According to a still further preferred embodiment of the present invention, the advisable ratio of values of pressure and temperature is selected within the range of pressure from 7.5 to 37.0 GPa and of temperature from room temperature to 1830° C., thereby providing a possibility of polymerization at conditions suitable for various kinds of technological equipments used in production of the synthetic diamonds, lonsdalite, and cubic boron nitride.

To improve the quality of the crystal lattice of the target product, the present invention recommends to cool the starting fullerite $C_{60}$ to a temperature of -196° C. and higher.

Figure 8:
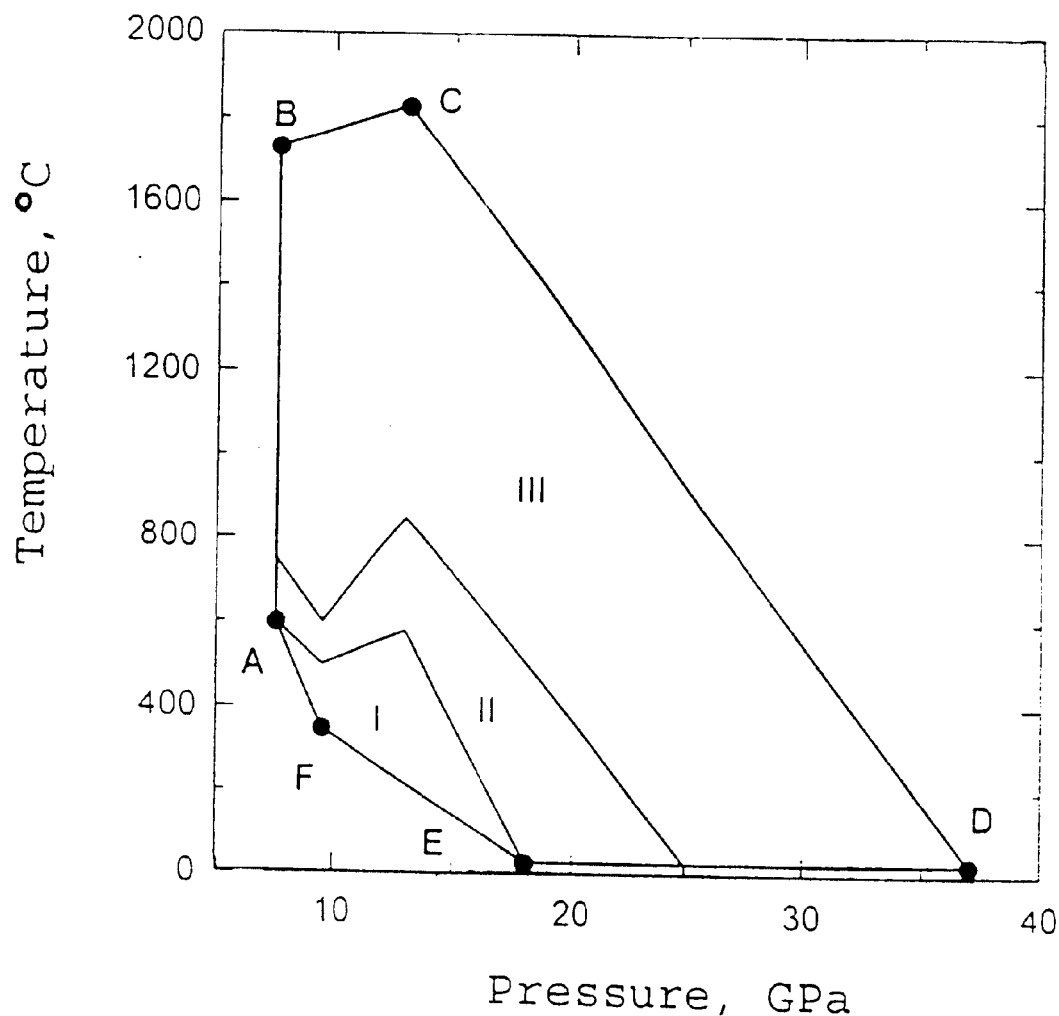

To guarantee production of the new material with a hardness of 50–170 GPa and higher and an electric conductivity $10^{-6}$–$10^2$ $ohm^{-1}$ $cm^{-1}$, the present invention recommends to select the ratio of values of pressure and temperature in the area delimited by the closed curve ABCDEF shown in the (P,T)-diagram of polymerization conditions presented in FIG. 8, wherein the points of the closed curve have the following positions (GPa,° C.): A: -7.5,600; B: -7.5,1750; C: -13,1830; D: -37,20; E: -18,20; F: -9.5,350.

Figure 9:
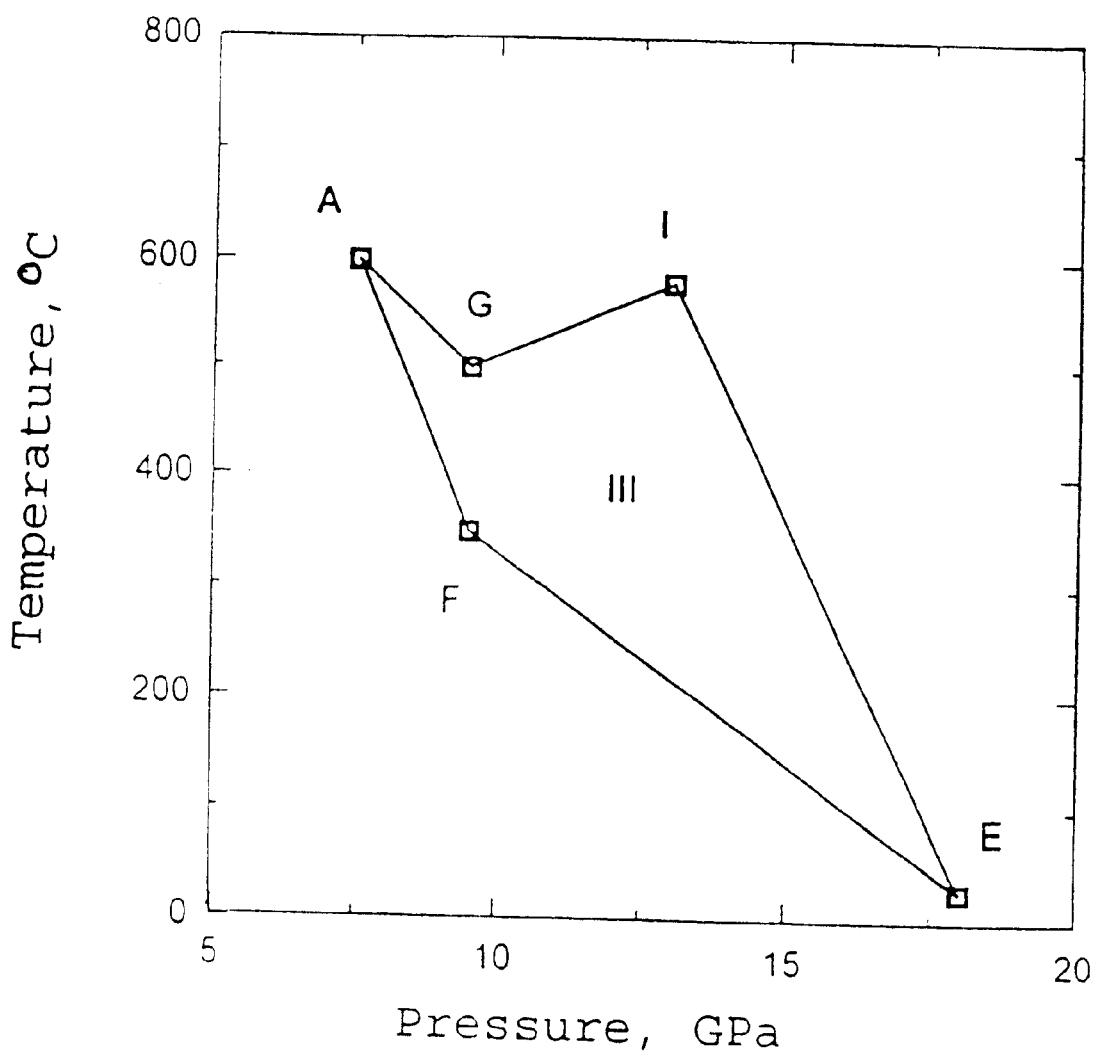

To obtain the new superhard material with a crystalline structure, the present invention recommends to select the ratio of values of pressure and temperature in the area delimited by the closed curve AGIEF shown in the (P,T)-diagram of polymerization conditions of FIG. 9, where the points of the closed curve have the following positions (GPa,° C.): A: -7.5,600, G: -9.5,500; I: -13,580; E: -18,20; F: -9.5,350.

Figure 10:
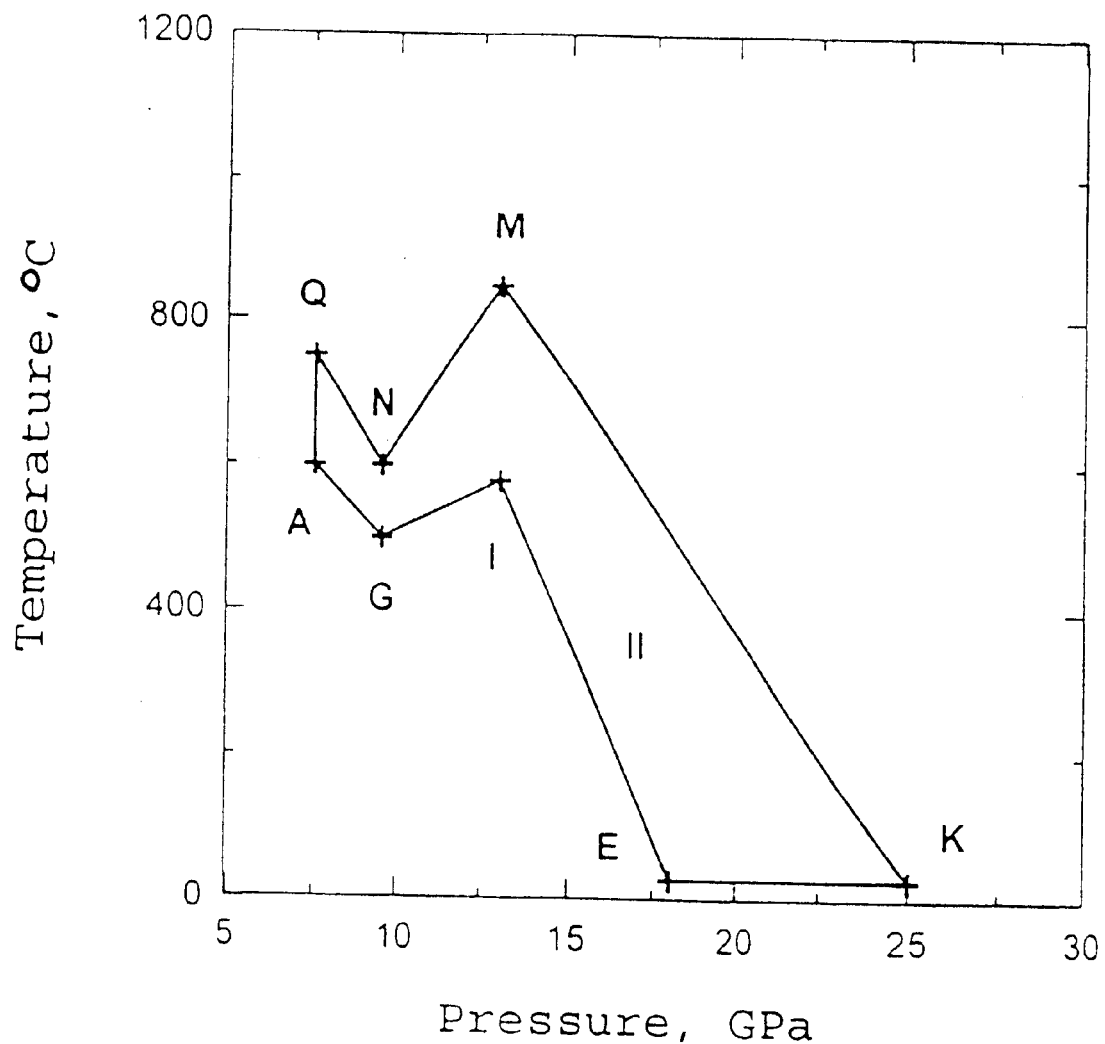

To obtain the new superhard material comprising in its structure both crystalline and amorphous zones, the present invention recommends to select the ratio of pressure and temperature in the area delimited by the closed curve AQNMKEIG shown in the (P,T)-diagram of polymerization conditions of FIG. 10, where the points of the closed curve have the following positions (GPa,° C.): A: -7.5,600; Q: -7.5,750; N: -9.5,600; M: -13,850; K: -25,20; E: -18,20; I: -13,580; G: -9.5,500.

Figure 11:
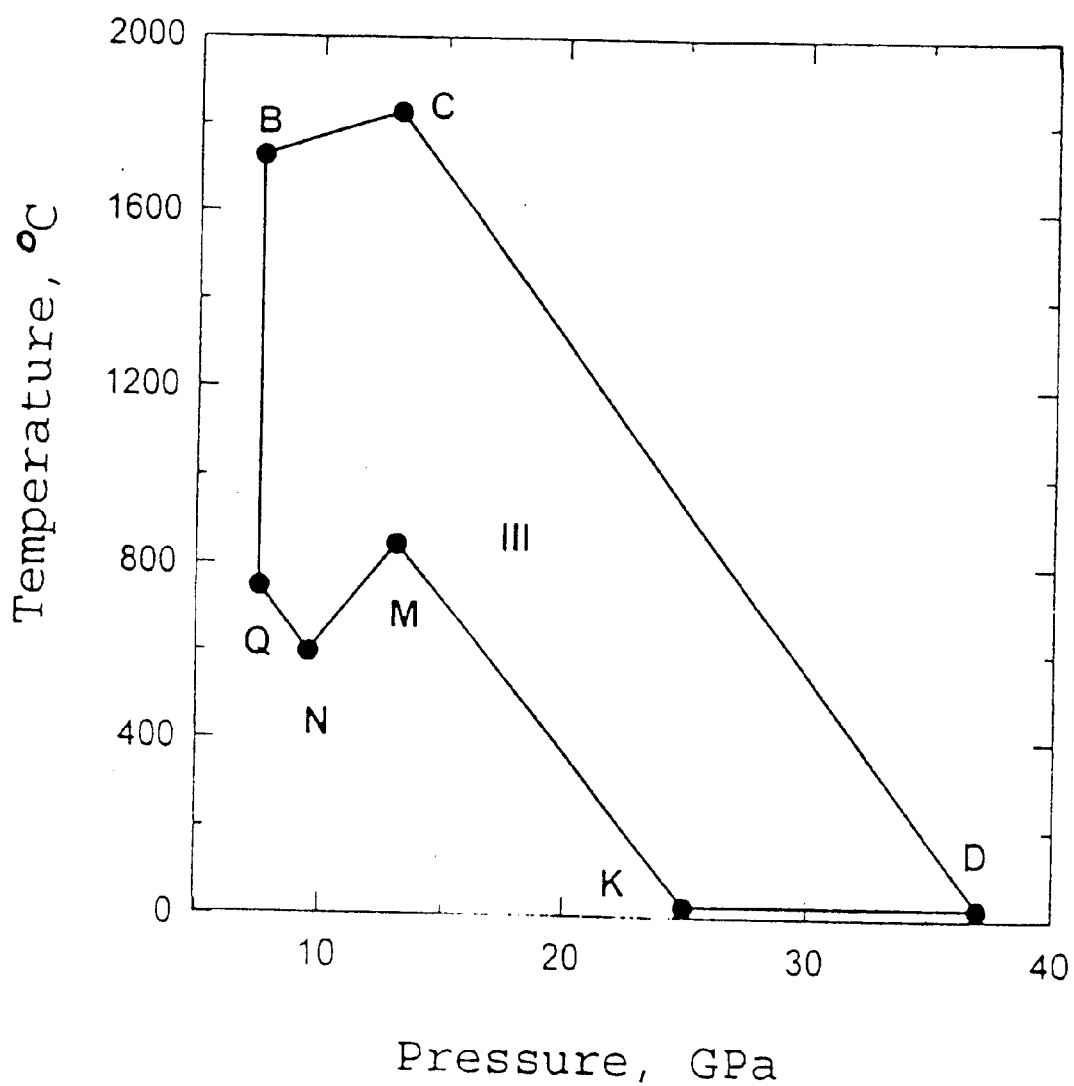

To obtain the new superhard material with an amorphous structure, the present invention recommends to select the ratio of pressure and temperature of polymerization in the area delimited by the closed curve QBCDKMN shown in the (P,T)-diagram of polymerization conditions of FIG. 11, where the points of the closed curve have the following positions (GPa,° C.): Q: −7.5,750; B: −7.5,1750; C: 13,1830; D: −37,20; K: −25,20; M: −13,850; N: −9.5,600.

To obtain the target material as a final article without a special finishing, the present invention recommends to cast the mold of the article with the required form prior to polymerization of the starting fullerite $C_{60}$.

This task is also solved due to the aforesaid article is made of the new superhard carbon material.

This task is also solved due to the aforesaid method of manufacturing the new article made of the new superhard carbon material.

The present invention allows to manufacture an article having a hardness in the range of 50–170 GPa and an electric conductivity $10^{-6}$–$102$ $ohm^{-1}cm^{-1}$.

Figure 2:
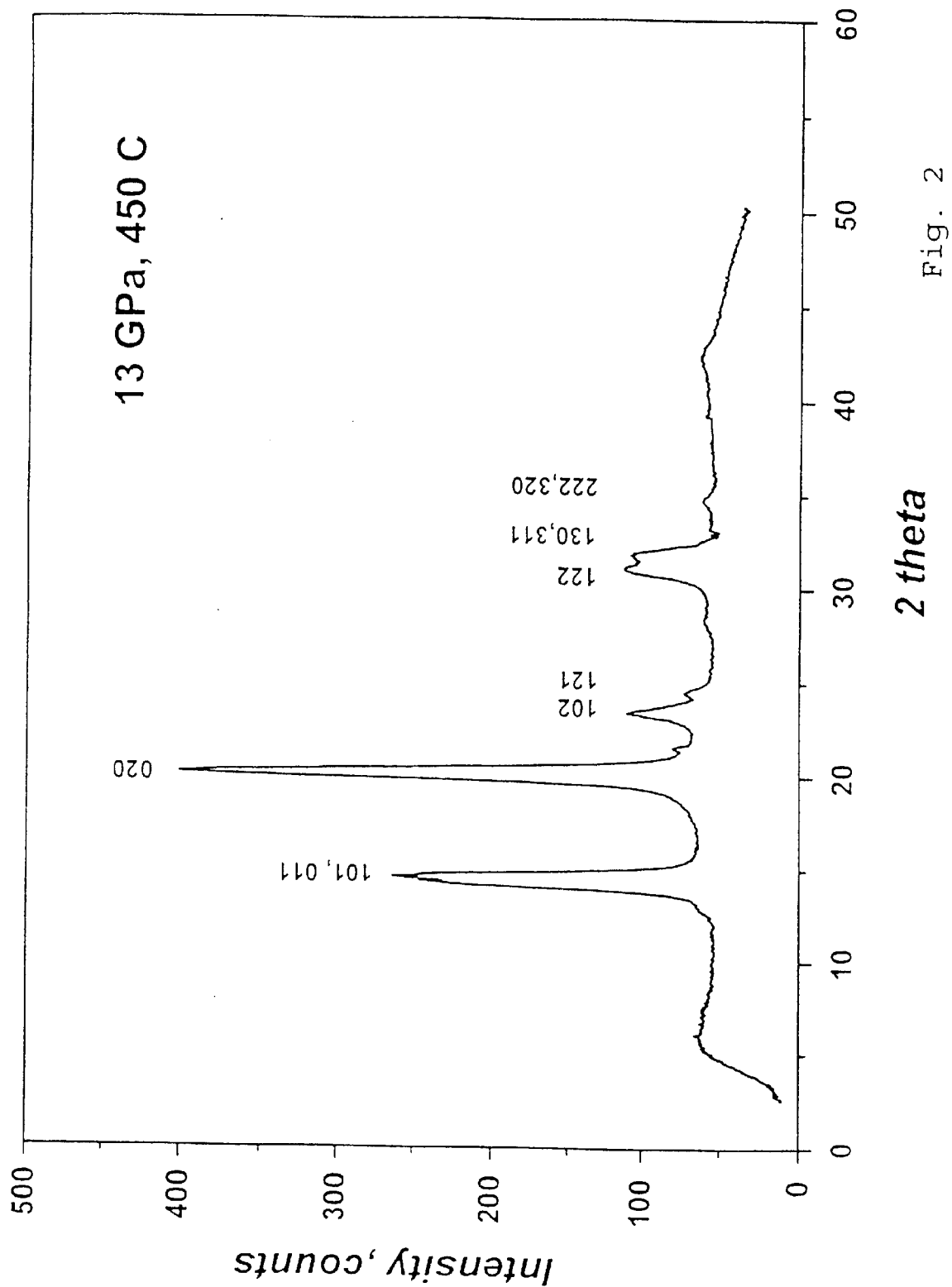
Figure 3:
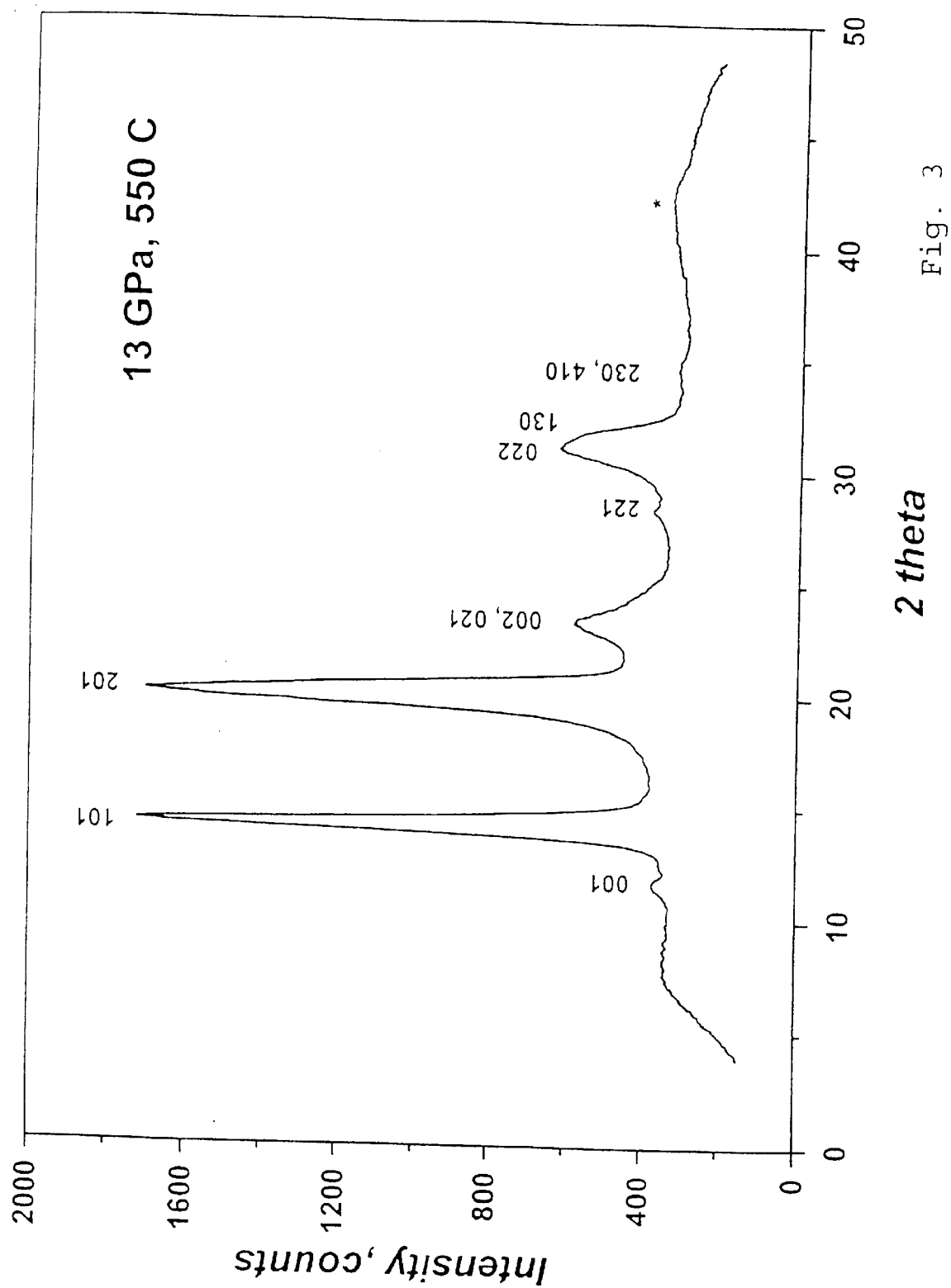
Figure 4:
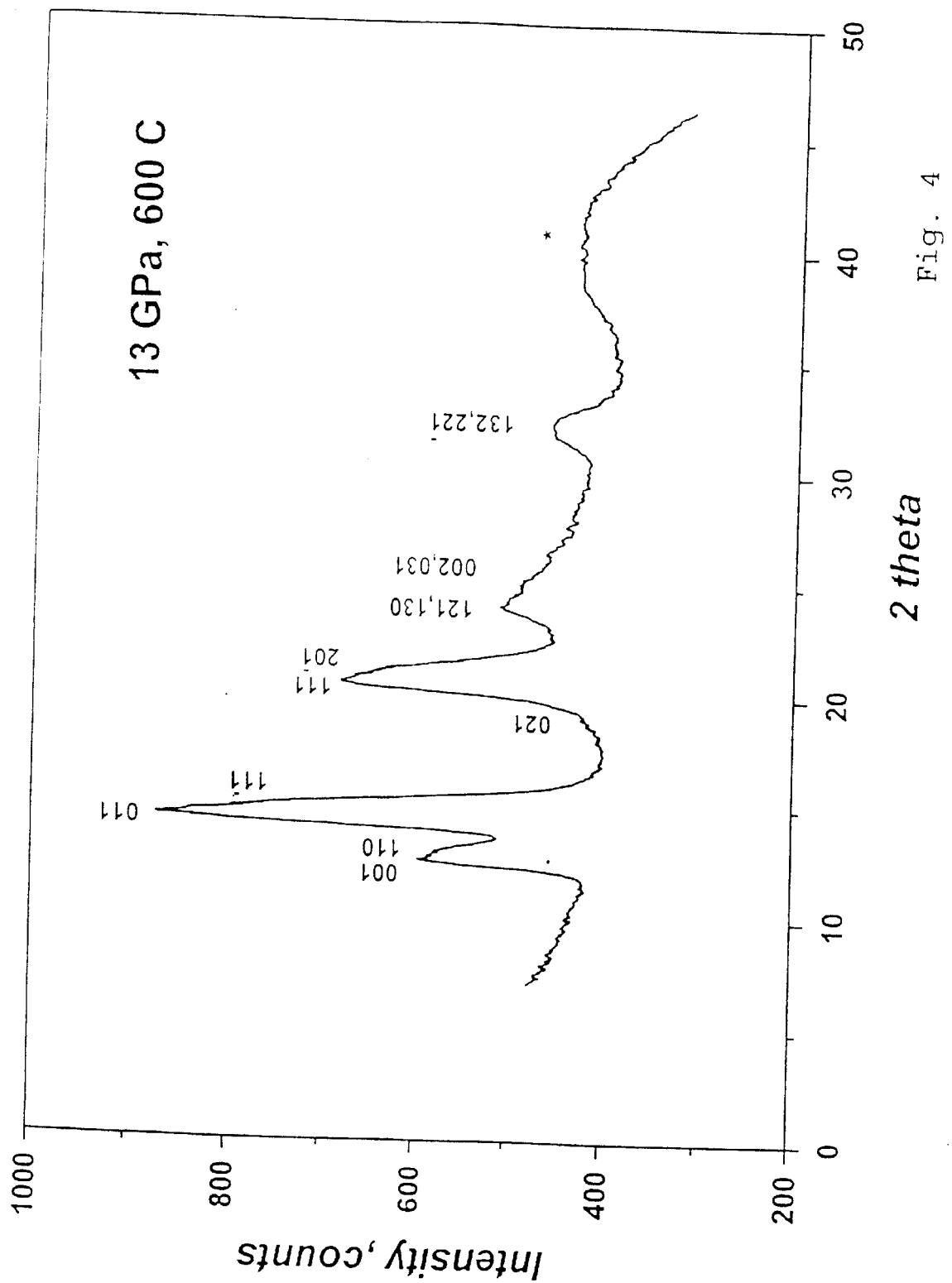
Figure 5:
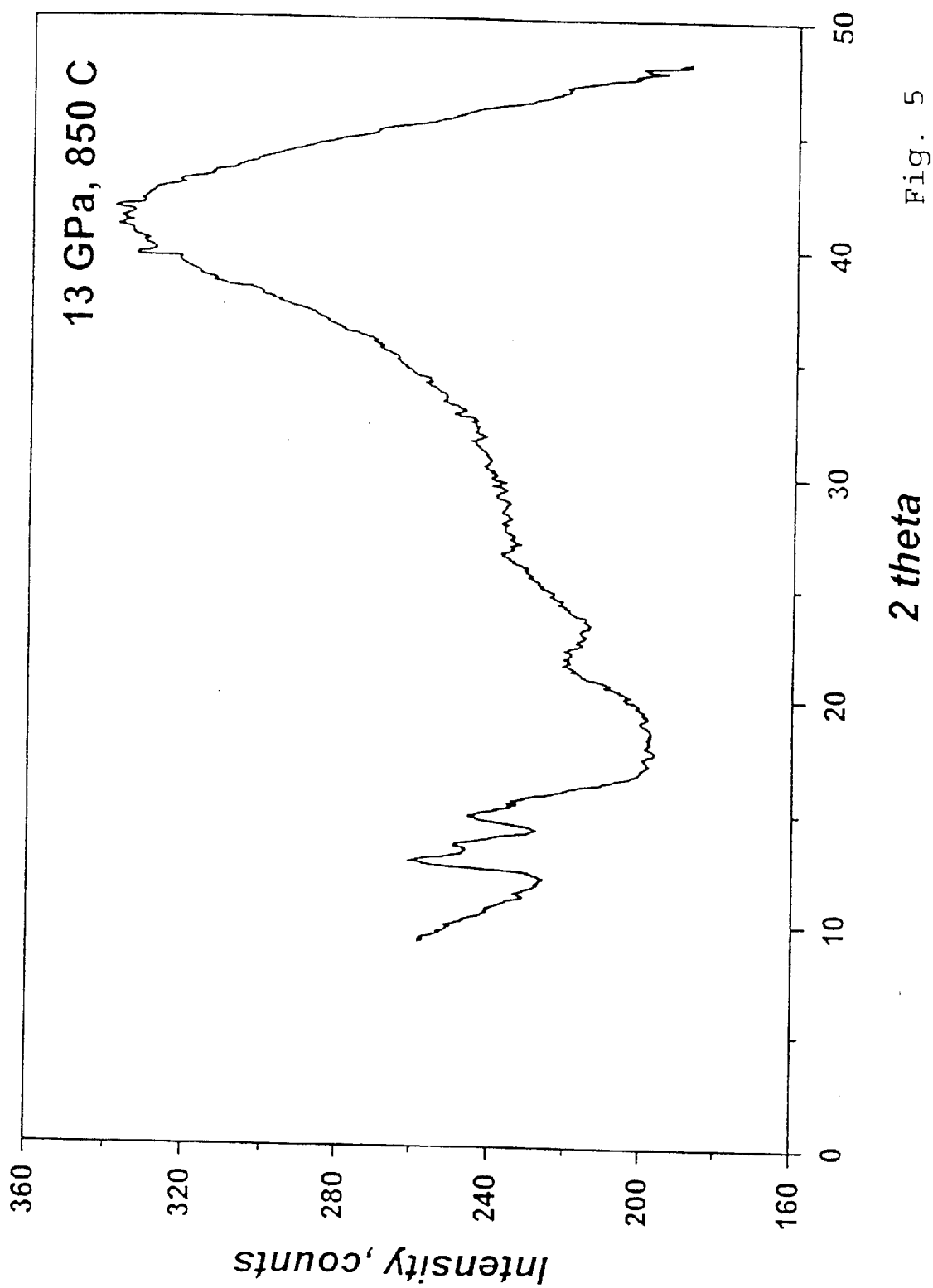
Figure 6:
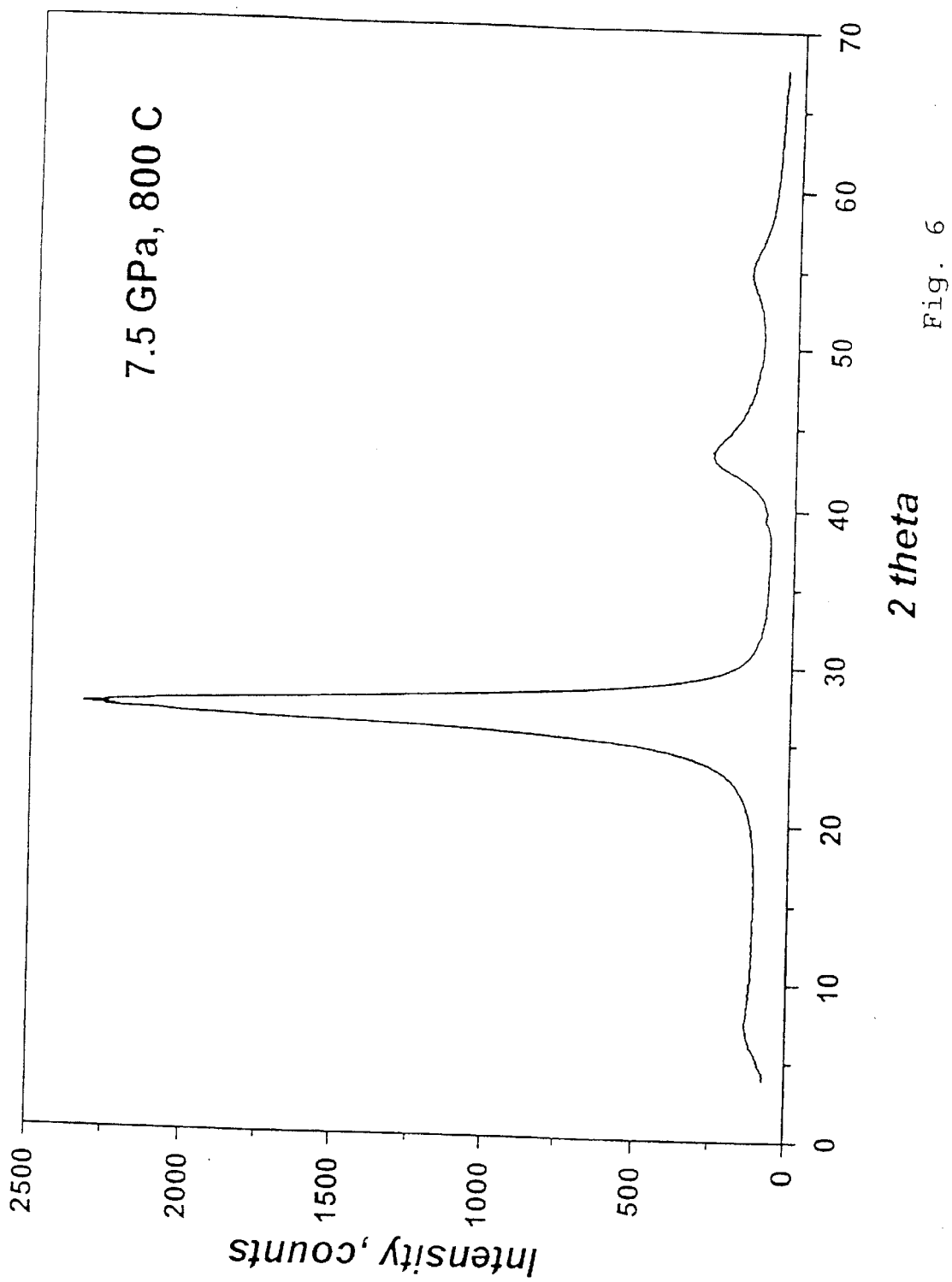
Figure 7:
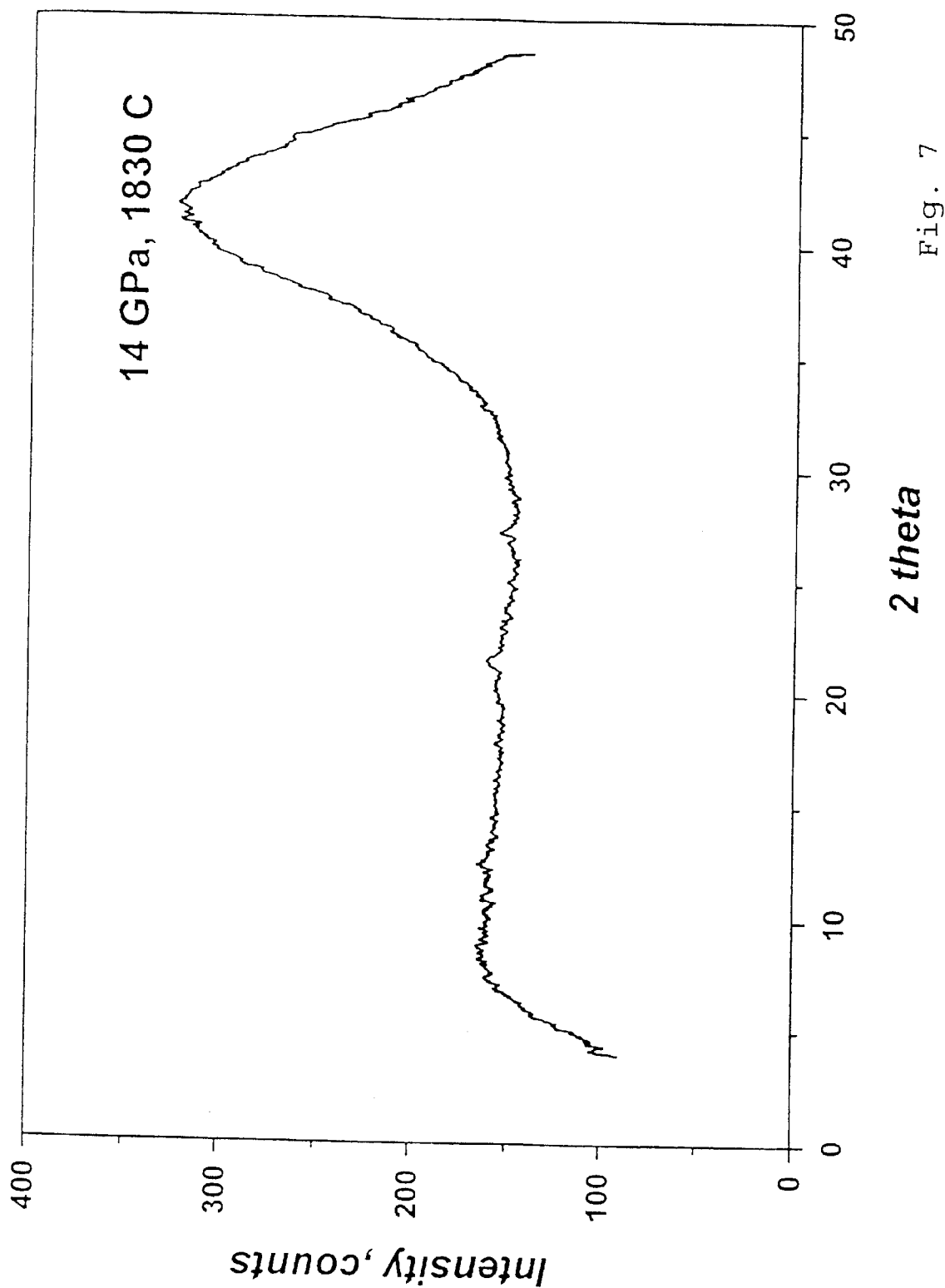
Figure 12:
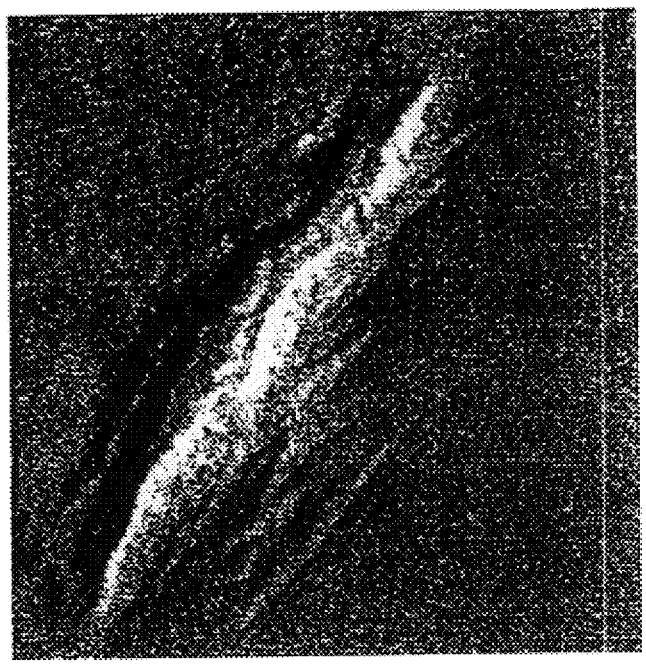
Figure 13:
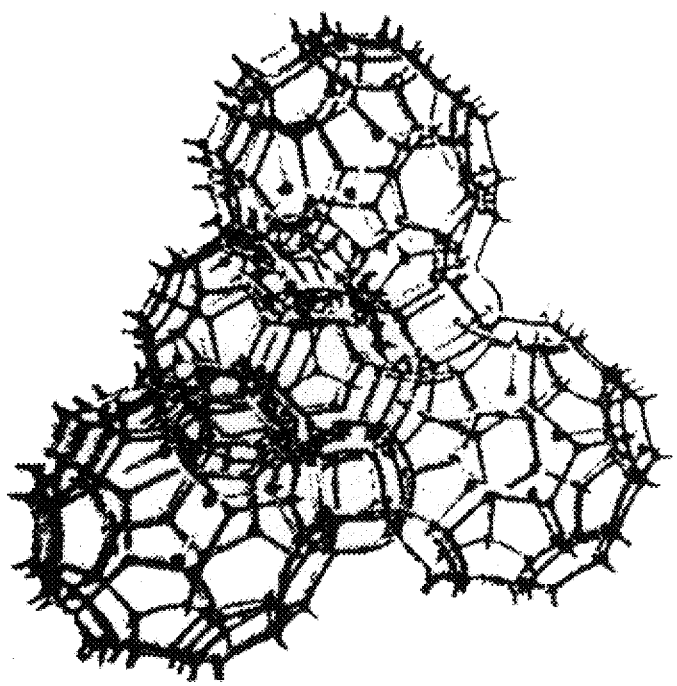
Figure 14:
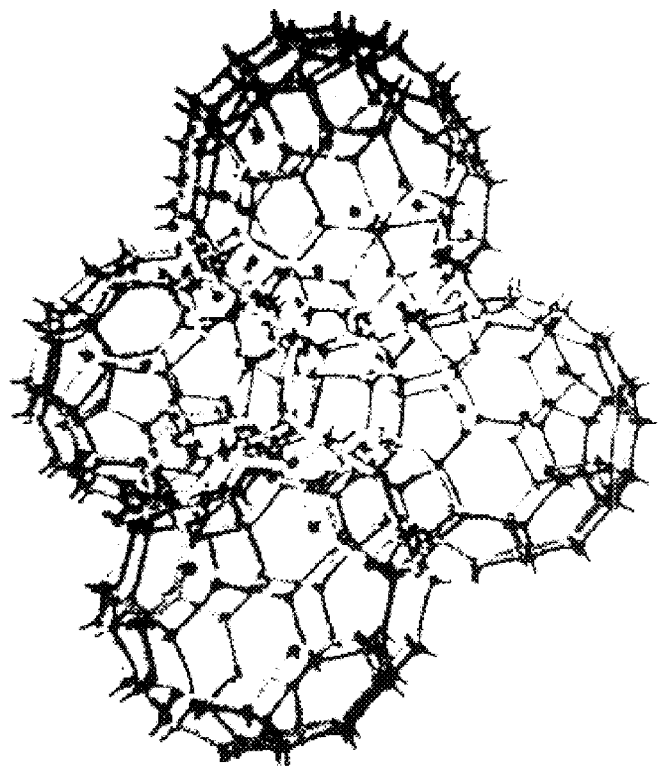
Figure 15:
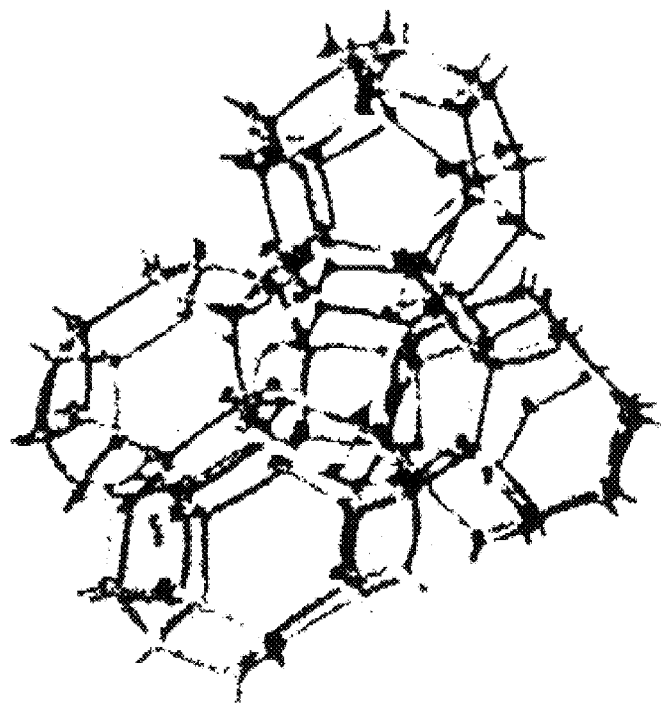

Further objects and advantages of the present invention are further illustrated by the following detailed description of the invention and with reference to the accompanying figures, in which:

FIG. 1 is an X-ray diffraction pattern of the superhard carbon material having the crystalline structure according to the present invention, FIG. 2 is an X-ray diffraction pattern of the superhard carbon material as in FIG. 1 prepared under different polymerization conditions, FIG. 3 is an X-ray diffraction pattern of the superhard carbon material as in FIG. 1 prepared under still different polymerization conditions, FIG. 4 is an X-ray diffraction pattern of the superhard carbon material as in FIG. 1 prepared under further different polymerization conditions, FIG. 5 is an X-ray diffraction pattern of the superhard carbon material having crystalline and amorphous structure elements according to the present invention, FIG. 6 is an X-ray diffraction pattern of the superhard carbon material having amorphous structure elements according to the present invention, FIG. 7 is an X-ray diffraction pattern of the superhard carbon material as in FIG. 6 prepared under different polymerization conditions, FIG. 8 is the diagram of the (P,T)-conditions of polymerization of superhard carbon material according to the present invention, FIG. 9 is the area I shown in FIG. 8, FIG. 10 is the area II shown in FIG. 8, FIG. 11 is the area III shown in FIG. 8, FIG. 12 is a micro-relief of the scratch on the (111) face of diamond produced by a fullerite indenter according to the present invention, FIG. 13 is a model of the tetrahedron created by four $C_{60}$ molecules in the polymerized body-centered cubic crystal structure, FIG. 14 is a model of the tetrahedron created by four $C_{60}$ molecules within the distorted $C_{60}$ polymer, FIG. 15 is a model of the tetrahedron created by four fragments of $C_{60}$ molecules within the distorted polymer.

The claimed superhard material is new both in its structure and in its specifications.

The structure of the claimed material according to the present invention mainly consists of bulk-polymerized structural elements appearing as tetrahedrons containing in their apices groups of carbon atoms, which may appear as molecules of fulleren $C_{60}$, spatially closed carbon formations of the fulleren type, remainders and fragments of the fulleren molecule. The claimed material may have crystalline and amorphous structures as confirmed by the results of X-ray crystallography. The obtained X-ray diffraction patterns of the claimed material were identified according to the position of diffraction maximums and the analysis of their intensities.

The crystalline structure of the claimed material is characterized by structural elements in the form of tetrahedrons, in the state of significantly ordered orientation, including distorted tetrahedrons, containing molecules of fulleren $C_{60}$ in their apices (see also FIG. 14).

The amorphous structure of the claimed material is characterized by a chaotically disordered orientation of the structural tetrahedrons caused, e.g. by deviation in the form of tetrahedrons from the regular form due to different orientations of molecules or their fragments (see also FIG. 15). The fragments may be carbon chains or spatially closed formations of the fulleren type.

In the structure of the claimed material there may be spaces where aggregations of structural elements in the form of tetrahedrons in the state of disordered orientation may be present.

The claimed new superhard material having said structure may be obtained by polymerization of the initial raw material fullerite $C_{60}$, whose structure may be presented as a recurrent pattern of tetrahedrons containing molecules of fulleren $C_{60}$ in their apices. The molecules of fulleren $C_{60}$ forming tetrahedrons in the initial fullerite are interconnected by weak Van der Waals forces. In the process of polymerization of fullerite the volume of the tetrahedrons is remarkably reduced from 119 Å$^3$ of the initial fullerite $C_{60}$ to about 59 Å$^3$ of the target product, wherein spaces are filled with spatially closed fulleren-like formations. The intermolecular bonds acquire a covalent or mixed character. According to the present invention, polymerization is carried out mainly without catalysts and under the action of pressure, higher temperature, and probably shearing strain measured as a rotation angle around the axis of application of load. The values of the conditions for the polymerization process should be sufficient for the formation of any of the above structures. It is found that the values of pressure and temperature should be interconnected within the pressure range from 7.5 GPa to 37.0 GPa and the temperature range from room temperature to 1830° C.

The claimed method envisages the action of pressure selected within the range of 7.5–37.0 GPa and temperature selected within the range of 20–1830° C. on the initial fullerite $C_{60}$, with an exposure of not less than one second. For such purposes and such conditions the known high-pressure chambers may be used providing the required parameters, e.g., "toroid"-chambers (N. N. Kuzin, A. A. Semerchan, N. N. Skasyrskaya, Doklady Akademii Nauk SSSR, 286 (1986) 1391) or chambers of the Bridgeman anvil type with an additional device providing high shearing strain (V. V. Aksenenkov, V. D. Blank, et al. Fizicheskoe Metallovedenie, 57 (1993) 394).

Prior to performance, the volume chambers should be calibrated using the known references: Bi (2.5, 7.7 GPa), Ba (5.3, 12 GPa), Fe (11.2 GPa), Pb (13 GPa), ZnS (14.5 GPa), GaP (22 GPa). By this, the relationship between the pressure in the chamber and the compressive strain is established. The chambers are temperature-calibrated commonly using Pt-Pt10Rh and W5Re-W20Re thermocouples, the relationship between the temperature in the reaction space of chambers and the electric power supplied to the heater being thus ascertained. The diamond anvils are pressure-calibrated by adding ruby powder to the initial fullerite and using a known pressure scale established on the frequency shift in the ruby luminiscence spectrum. In addition, the diamond chamber is calibrated by the value of the load on anvils applied by a spring-controlled loading device.

The starting fullerite in a capsule is introduced into a graphite heater, then placed in a container transferring pressure to a sample of the starting fullerite when the punches are compressed. This method may be performed either by first exposing the starting fullerite $C_{60}$ to pressure and then heating under pressure, or by preliminarily cooling or heating a sample of fullerite $C_{60}$ and then exposing it to pressure.

The required high specifications of the obtained material within the selected ranges of pressure and temperature are ensured by the resulting decrease in the distance between the molecules and the transition to another type of structure. As a result of the formation of strong bonds between molecules $C_{60}$ the new structures persist when pressure is discontinued and the material is cooled to room temperature.

The obtained X-ray diffraction patterns (abscissa=reflection angle (2 theta); ordinate=the number of recorded impulses) reflecting particular states of the sample of superhard carbon material obtained under the above described conditions, indicate the formation of the following structures with the following specifications:

The crystalline structures of the claimed material.

Face-Centered Cubic Structure (P=13 GPa, T=550° C.).

The structure (shown schematically in FIG. 12) is crystalline with short areas of coherent diffraction. Since the diffraction pattern (FIG. 1) is very poor, reflections are diffuse, the width of peaks exceeds the instrumental width by 1° 2 theta. The crystalline structure is face-centered cubic, the parameter of the unit cell, the length of the cube edge, is within 12.1–13.3 Å depending on the polymerization temperature: at higher temperatures this parameter decreases. The structure is space-filled with bulk-polymerized tetrahedrons of molecules of fulleren $C_{60}$. The size of a rib of the tetrahedron, the shortest distance between molecules, oriented along the diagonal of the face of a unit cell, is within 8.6–9.4 Å depending on the polymerization conditions. X-ray density ist 2.63–2.03 g/cm$^3$. The volume of tetrahedron is 53.6–69.3 Å$^3$. Hardness is 80–50 GPa.

Bulk-Centered Structure with Various Rhomboid Distortion (P=13 GPa, T=450° C.).

The diffraction pattern (FIG. 2) is characterized by a small quantity of wide maximums, i.e. also has small-sized areas of coherent diffraction. The crystalline structure is bulk-centered pseudocubic with a slight rhomboid distortion (±0.6 Å). The Parameters of a unit cell are: a=9.53 Å, b=8,87 Å, c=8.34 Å, Z=2, X-ray density=3.2 g/cm$^3$. The length of ribs of the rhomboid tetrahedron of molecules of fulleren $C_{60}$ in different direction of the structure is measured from 7.7 to 9.5 Å. The volume of the structural tetrahedron is 79.9 Å$^3$. The hardness is 130–170 GPa.

At higher temperatures (P=13 GPa, T=550° C.) of the polymerization process the rhomboid distortion of the bulk-centered structure increases, additional reflections appear, the width of maximums increases (FIG. 3). The parameters of a unit cell are: a=10.93 Å, b=8.98 Å, c=7.62 Å, Z=2, rho=3.19 g/cm$^3$, rho(exp.)=3.1 g/cm$^3$. The rib length of the tetrahedron in different directions is within 7.62–11.0 Å, i.e. also increases at increasing temperatures. The volume of the structural tetrahedron is 81.7 Å$^3$ and the hardness 110–150 GPa.

Bulk-Centered Structure with Monoclinic Distortion

Further increase in temperature (P=13 GPa, T=600° C.) causes the monoclinic distortion of the bulk-centered cubic structure (FIG. 4). The Parameters of a unit cell are: a=10.27 Å, b=7.8 Å, c=9.49 Å, beta=92.40, Z=2, rho(roentg.)=3.15 g/cm$^3$, rho(exp.)=3.1 g/cm$^3$. The length of the rib of the monoclinic-distorted structural tetrahedron is within 7.8–10.3 Å. The volume of structural tetrahedron is 83.1 Å$^3$ and the hardness is 100–130 GPa.

The claimed Material with Crystalline and Amorphous Structure (P=13 GPa, T=850° C.)

There are two states in the structure, a crystalline and an amorphous state (FIG. 5). This structure differs from the above structures in greater distortion of the structural tetrahedron and in a greater disorder of orientation of the structural tetrahedrons. The loss of remote order is expressed in a low number of diffraction maximums, sharp drop of their intensity, and increase in the diffusion maximum by about 41.2° 2 theta. If monoclinic splitting is disregarded, the 3 observed wide diffraction maximums may be indexed in a cubic structure with a parameter of 12.1 Å. A vague peak with an interplane distance of about 1.19 Å indicates the disruption of molecules of fulleren $C_{60}$ into separate fragments, which may be combined into corrugated hexagonal layers with the period a=2.52 Å and a complete absence of translation between layers. It may be assumed that these layers are similar to lonsdalite layers.

Disordered Structure of the claimed Material (P=7.5 GPa, T=800° C., P=13 GPa, T=1300° C.)

Wide diffusion maximums observed on diffractograms (FIGS. 6 and 7) indicate an amorphous structure of the material with chaotically oriented tetrahedral structural elements. The diffraction pattern is unequivocally interpreted as one belonging to the hexagonal layered structure with disorderly oriented tetrahedrons having in their apices the groups of carbon atoms, mainly groups of several units of carbon atoms. Analysis of intensities reveals the limits of interlayer distances, which correspond to diameters of molecules of fulleren $C_{60}$ along different symmetry axes. The recurrence period inside a layer is also calculated. The diffraction patterns shown in FIGS. 6 and 7 demonstrate that the layers may be produced by both the tetrahedrons formed by the whole molecules of fulleren $C_{60}$ and by their fragments.

Analysis of the X-ray diffraction pattern data confirms that in the structure of the claimed material the length of the rib of a structural tetrahedron is from 7.6 Å to about 11.2 Å. The decrease in lengths of ribs of tetrahedral structural elements forming the face-centered cubic lattice of the starting fullerite $C_{60}$ and a simultaneous decrease in the volume of the tetrahedrons from a value 119 Å$^3$ to a value of 83–60 Å$^3$ occurs as a result of the action of pressure and probably of increased temperature and shearing strain, i.e. under the claimed polymerization conditions. This results in the formation of rigid covalent bonds between the molecules of fulleren $C_{60}$ and in the formation of new structural elements in the form of tetrahedrons having in their apices both the whole fulleren molecules and their fragments in the form of carbon chains or spatially closed formations of the fulleren type. In this case an average length of the shortest bonds between carbon atoms is 1.47–1.52 Å, i.e. less than in the structure of diamond. Thus, the structure of the claimed carbon material is formed of tetrahedral elements whose structure, mutual position, and parameters provide a high hardness and a high electric conductivity of the carbon material.

However, the principal and sufficient condition controlling the superhardness of the new carbon material is the presence of bulk-polymerized tetrahedral elements in its structure, containing in their apices groups of carbon atoms. Fulfillment of this condition predetermines the structure, mutual position, and structural parameters of the material.

This condition can be met most reliably by the use of fullerite $C_{60}$ as the starting material under conditions as claimed in the present invention.

The orientation of molecules in the structure of the initial fullerite $C_{60}$ and the decrease in the local scattering in parameters of the crystalline structure of the claimed material from 2% to 1% is obtained by a cooling to a temperature of −196° C. or higher, prior to the exposition of the starting fullerite to pressure and probably to heat. In order to guarantee obtainance of the new material with a hardness of 50–170 GPa and higher and with an electric conductivity of $10^{-6}$–$10^2$ ohm$^{-1}$ cm$^{-1}$ the ratio of values of pressure and temperature of polymerization should be selected in the area delimited by the closed curve ABCDEF shown in the (P,T)-diagram of polymerization conditions, presented in FIG. 8, where the points of the closed curve have the following positions (GPa,° C.): A: −7.5, 600; B: −7.5,1750; C: −13,1830; D: −37,20; F: −9.5,350.

To obtain the claimed material with crystalline structure the ratio of values of pressure and temperature should be selected in the area I, delimited by the closed curve AGIEF shown in the (P,T)-diagram of polymerization conditions presented in FIGS. 8 and 9, where the points of the closed curve have the following positions (GPa,° C.): A: −7.5,600; G: −9.5,500; I: −13,580; E: −18,20; F: −9.5,350.

To obtain the claimed material containing both crystalline and amorphous areas the ratio of values of pressure and temperature should be selected in the area II delimited by the closed curve AQNMKEIG shown in the (P,T)-diagram presented in FIGS. 8 and 10, where the points of the closed curve have the following positions (GPa,° C.): A: −7.5,600; Q: −7.5,750; N: −9.5,600; M: −13,850; K: −25,20; E: −18,20; I: −13,580; G: −9.5,500.

To obtain the claimed material with the amorphous structure the ratio of values of pressure and temperature of polymerization should be selected in the area III delimited by the closed curve QBCDKMN shown in the (P,T)-diagram presented in FIGS. 8 and 11 where the points of the closed curve have the following positions (GPa,° C.): Q: −7.5,750; B: −7.5,1730; C: −13,1830; D: −37,20; K: −25,20; M: −13,850; N: −9.5,600.

The claimed invention allows to obtain upon polymerization the final article, thereby not requiring labor-consuming special finishing. To achieve this, it is only necessary to cast the mold of the article in the desired form prior to the polymerization of the starting fullerite $C_{60}$ therein.

The article made of the claimed new superhard carbon material may be an "anvil" for high-pressure chambers, a cutting plate for mechanical working of metals and alloys, various indenters, elements for semiconductor devices, various transducers. These articles are suitable for use, e.g. in metal working, treatment of natural stone, of other hard and superhard materials, and in electronics, since they have a hardness reaching 170 GPa and an electric conductivity of $10^{-6}$–$10^2$ ohm$^{-1}$ cm$^{-1}$, possess a high thermostability of up to 1000° C. and chemical stability since they are not soluble in organic solvents and inorganic acids.

The hardness of the new superhard carbon material, determined by Raman spectroscopy, exceeds that of diamond by 20%. The density is 2.1–3.5 g/cm$^3$. The combination of the determined parameters of polymerization conditions and of structural features of the new superhard carbon material results in producing the articles in the process for preparing the claimed material.

The following examples illustrate the claimed invention and in no way are intended to limit the scope of it.

EXAMPLE 1

The initial quantity of pure (99.98%–$C_{60}$) fullerite $C_{60}$ with face-centered cubic structure (a=14.17 A), namely 80 mg by weight, is placed in the apparatus of the "toroid" type, then according to the calibration of the apparatus a strain is applied, that is necessary to obtain the efficient pressure of 14 GPa. After the working pressure is reached, the sample is heated to 1839° C. during 290 seconds, then it is cooled to room temperature and the pressure is decreased to atmospheric pressure. The weight of the compact sample is 79 mg. The sample density, determined by the method of hydrostatic weighing, is (3.35±0.10) g/cm$^3$ (the density of the initial $C_{60}$ is equal to 1.68 g/cm$^3$). After splitting the sample, from its inner part a 0.3×0.3×0.3 mm$^3$ sized particle is selected to prepare a diffractogram using Cu-K$_{alpha}$ radiation. The diffractogram demonstrates one wide diffusion maximum with a distance between the planes of 2.16–2.18 Å; there are no peaks characteristic of diamond. The obtained sample of the material possesses a hardness surpassing the hardness of the most hard face of diamond (111) (compare FIG. 12). The material is insoluble in organic solvents (benzine, acetone, toluene, etc.) and in inorganic acids (HCl, $H_2SO_4$, $HNO_3$, HCl+$HNO_3$).

EXAMPLE 2

50 mg of the initial fullerite $C_{60}$ with face-centered cubic structure are placed in a metal capsule of Ta—Nb alloy. The capsule with the sample is placed in a graphite heater. Then the heater is placed in a tubular envelope of $Al_2O_3$ and $Si_3N_4$ (50:50 weight %). The assembled unit then is placed into a container of natural mineral, e.g. of Algate stone.

The thus assembled high-pressure unit is placed into a high-pressure chamber. The chamber is loaded up to 5 GPa pressure using a press. The sample is heated under pressure to 550° C. and exposed for 30 minutes, then at this temperature the pressure is increased to 7.5 GPa and the temperature to 800° C. The exposure at the maximum temperature is 5 minutes. The sample is cooled at a rate of 200°/second, the pressure is decreased to atmospheric pressure and the sample is extracted mechanically. The weight of the sample is 0.49 mg, the density of the sample is 2.1 g/cm$^3$. The material is monolithic, there are amorphous and crystalline components in its structure. The material has a hardness equal to the hardness of cubic boron nitride and a specific electric conductivity that is characteristic of semimetals, namely $10^2$–$2\times10^2$ ohm$^{-1}$ cm$^{-1}$.

EXAMPLE 3

140 mg of the initial fullerite $C_{60}$ is formed in an ingot mold made in the form of a truncated cone. The mold with the sample is placed into a graphite heater of the proper form. The high-pressure unit is collected in a way similar to Example 1 and exposed to 13 GPa at 1400° C. during 60 seconds. The sample, similar in form and size to the size of the "anvil" of the superhigh-pressure chamber, is extracted as above. The obtained article has a density of 3.1 g/cm$^3$, is homogenous in structure, and its hardness surpasses that of diamond.

EXAMPLE 4

The initial quantity of pure (99.98%–$C_{60}$; 0.01%–$C_{70}$) fullerite, about 0.2 mg, is introduced into the opening of a steel gasket of 0.5 mm diameter, placed between diamond anvils with working areas of 0.8 mm diameter, and loaded until the pressure in the chamber is 37 GPa according to calibration by the ruby pressure scale. Having unloaded the high-pressure chamber, the sample is extracted as a monolithic grain from the metal gasket and its structure is investigated using the X-ray diffraction method. The diffraction pattern of the obtained material is generally similar to that shown in FIG. 7. The density of the obtained material determined by the method of submersion into dense liquids is about 3.3 g/cm³. The hardness of the material is higher than 110 GPa.

EXAMPLE 5

The initial quantity of pure (99.98%–$C_{60}$; 0.01%–$C_{70}$) fullerite, about 0.3 mg, is introduced into the opening of a steel gasket of 0.7 mm diameter and introduced between the diamond anvils with working areas of 1 mm diameter, and loaded up to 0.5 GPa in the chamber according to calibration. The chamber then is placed without the spring-controlled loading device into an upper part of a Dewar flask containing in its lower part liquid nitrogen at –196° C. Having exposed it in the flask for 2 hours, the chamber is taken out, the spring-controlled loading device is appended and loaded to a pressure of 18 GPa according to the calibration.

A 30 W spiral-heater surrounding both the anvils and the sample between them is switched on and the sample is heated up to 150° C. during 1 hour. The temperature of the sample is measured with a copper-constantan thermocouple situated immediately on the sample and preliminarily temperature-calibrated in the area between anvils. Then the heater is switched off, cooled to room temperature, and the load is gradually removed from the chamber. Having unloaded the high-pressure chamber, the sample is extracted from the gasket as a monolithic grain of about 0.2 mg. Its structure is investigated using the X-ray diffraction method. The diffraction pattern of the obtained material is generally similar to that shown in FIG. 2, but with narrower lines of X-ray diffraction. The density of the material is about 3.1 g/cm³, the hardness is about 110 GPa.

EXAMPLE 6

The initial quantity of pure (99.98%–$C_{60}$; 0.01%–$C_{70}$) fullerite, about 0.2 mg in weight, is introduced into an opening of a steel gasket of 0.5 mm diameter, placed between diamond anvils with working areas of 0.8 mm diameter and loaded to the pressure of 20 GPa according to the calibration by the ruby pressure scale. Then one of the anvils is rotated around the axis of load application by an angle of about 15°. Then the chamber is unloaded and the sample extracted from the metal gasket as a monolithic grain. Its structure is investigated using the X-ray diffraction method. The diffraction pattern of the obtained material is generally similar to that shown in FIG. 5. The density of the obtained material is about 3.2 g/cm³. The hardness is over 110 GPa.

EXAMPLES 7–10
(Table 1)

The new superhard carbon material is obtained as indicated in examples 1–3. The actual conditions of realization of polymerization and the obtained characteristics are indicated in Table 1.

TABLE 1

| | | | | Characteristics of obtained materials | | | | |
|---|---|---|---|---|---|---|---|---|
| NN | Synthesis parameters | | | Volume of tetrahedrons, cub. ang. | Material structure | rho (g/cm³) | Hardness (PGa) | Conductivity (ohm⁻¹ cm⁻¹) |
| | P (GPa) | T (° C.) | Time (sec) | | | | | |
| 7 | 13 | 500 | 126 | 65 | Crystal line | 3.1 | >110 | $10^{-3}$ |
| 8 | 14 | 800 | 60 | 82 | Cryst. + amorph. | 3.2 | ca 130 | $1.5 \times 10^{-4}$ |
| 9 | 10 | 600 | 700 | 62 | Cryst. + | 2.6 | 80 | 102 |
| 10 | 14 | 1400 | 40 | no data | Amorph. | 3.4 | 170 | 10–5 |

Experiment 1

An indenter produced of fullerite $C_{60}$ as above was used to prove the hardness of an article made of the material of the sent invention. Scratch-tests were carried out in a common apparatus showing that the indenter produced by the material of the present invention indeed is harder than diamond.

In this respect it is referred to FIG. 12 showing a micro-relief of the produced scratch on the (111) face of diamond obtained with the fullerite indenter of the present invention.

Experiment 2

The elastic constants of the fullerite samples were calculated after measurements of the sound wave velocities by means of acoustic microscopy. An ultra-short pulse wide-field scanning acoustic microscope WFPAM was applied in reflection mode. Operation frequency of the microscope was 25–100 MHz, probe pulse duration 50 ns, aperture of the acoustic lenses was 30–60°. At 30 MHz operating mode and water as an immersing medium a diameter of the spot of the acoustic beam on the surface of the sample was about 0.1 mm. After polishing the samples having plane-parallel reflecting surfaces their thickness was 1.5–2.0 mm. The time delay interval (flight-time) between probe and reflected impulse was in the range of $10^{-20}$ μs, depending on the type of wave (longitudinal or shear) and signals of a particular sample. Knowing the thickness of the sample, type of wave and flight-time, the acoustic wave velocities were calculated. After that, neglecting the nonlinear effects, the linear elastic modulus were calculated on the basis of the measured velocities and densities of the samples. The values of velocities are averaged over 3–4 different points for each sample. The accuracy of measurements is ±0.1 km/s.

The results of measurements and calculations for ultra-hard samples obtained at 13 GPa pressure and at two different temperatures are represented in Table 2.

TABLE 2

| T (K) | ρ (g/cm³) | $c_l$ (km/s) | $c_t$ (km/s) | G (GPa) | K (GPa) | E (GPa) | v |
|---|---|---|---|---|---|---|---|
| 1500 | 3.15 | 17.0 | 8.0 | 200 | 640 | 550 | 0.36 |
| 1770 | 3.3 | 20.2 | 8.5 | 240 | 1030 | 660 | 0.39 |
| diamond | 3.51 | 17.5–19.6 | 11.6–12.8 | 354–535 | 440 | 1100 | 0.08 |

Density of the samples ρ, velocities of the longitudinal $c_l$ and transverse $c_t$ acoustic waves, shear modulus G, bulk modulus K, Young's modulus E and Poisson's ratio v as a function of temperature T of the synthesis of the fullerite samples under pressure of 13 Gpa are given. Values for monocrystal diamond are represented for comparison.

What is claimed is:

1. A superhard carbon material having a structure comprising bulk-polymerized structural elements in the form of tetrahedrons, wherein said structural elements in the form of tetrahedrons contain in their apices groups of carbon atoms, the material having a hardness of at least 170 GPa, an electric conductivity of $10^{-6}$–$10^2$ ohm$^{-1}$cm$^{-1}$ and a bulk modulus in the range of 640 GPa to 1030 GPa.

2. The material according to claim 1, characterized in that the groups of carbon atoms are spatially-closed shells.

3. The material according to claim 1, characterized in that the groups of carbon atoms have the spatial structure of fulleren $C_{60}$ molecules.

4. The material according to claim 1, characterized in that the material has a crystalline structure, in which the structural elements, in the form of tetrahedrons, are in a crystalline ordered orientation.

5. The material according to claim 1, characterized in that the structural elements in the form of tetrahedrons are in the state of disordered orientation.

6. The material according to claim 1, characterized in that its structure contains structural elements in the form of tetrahedrons in the state of ordered orientation and structural elements in the form of tetrahedrons in the state of disordered orientation.

7. A method for obtaining superhard carbon material as claimed in claim 1 comprising the polymerization of an initial fullerite $C_{60}$ to a target material, wherein polymerization is carried out until formation of tetrahedrons, containing in their apices the groups of carbon atoms, appears in the structure of the target material.

8. he method according to claim 7, characterized in that the polymerization of the initial fullerite is carried out under non-catalytic conditions.

9. The method according to claim 8, characterized in that the realization of the polymerization is carried out at a pressure and a temperature that allow a formation of bulk-polymerized structural elements in the form of tetrahedrons containing in their apices groups of carbon atoms in the structure of the target material.

10. The method according to claim 7, characterized in that during the polymerization of the initial fullerite $C_{60}$ a process of shearing strain is carried out.

11. The method according to claim 9, characterized in that the relationship of values of pressure and temperature is selected within the pressure range from 7.5 to 37 GPa and within the temperature range from room temperature to 1830° C.

12. The method according to claim 7, characterized in that the initial fullerite is cooled to a temperature of −196° C. and higher prior to polymerization.

13. The method according to claim 11, characterized in that the ratio of values of pressure and temperature of polymerization is selected in the area delimited by the closed curve ABCDEF shown in the (P,T)-diagram of polymerization conditions of FIG. 8 where the points of the closed curve have the following positions (GPa,° C.): A: −7.5,600; B: −7.5,1730; C: −13,1830; D: −37,20; E: −18,20; F: −9.5, 350.

14. The method according to claim 11, characterized in that the ratio of values of pressure and temperature of polymerization is selected in the area delimited by the closed curve AGIEF shown in the (P,T)-diagram of polymerization conditions of FIG. 9 where the points of the closed curve have the following positions (GPa,° C.): A: −7.5, 600; G: −9.5,500; I: −13,580; E: −18,20; F: −9.5,350.

15. The method according to claim 11, characterized in that the ratio of values of pressure and temperature of polymerization is selected in the area delimited by the closed curve AQNMKEIG shown in the (P,T)-diagram of polymerization conditions of FIG. 10, where the points of the closed curve have the following positions (GPa,° C.): A: −7.5,600; Q: −7.5,750; N: −9.5,600; M: −13,850; K: −25,20; E: −18,20; I: −13,580; G: −9.5,500.

16. The method according to claim 11, characterized in that the ratio of values of pressure and temperature of polymerization is selected in the area delimited by the closed curve QBCDKMN shown in the (P,T)-diagram of polymerization conditions presented in FIG. 11, where the points of the closed curve have the following positions (GPa, CIC): Q: −7.5,75,0; B: −7.5, 1750; C: −13,1830; D: −37,20; K: −25,20; M: −13,850; N: −9.5,600.

17. The method according to claim 7, characterized in that a mold of an article of the required form is cast prior to polymerization of the initial fullerite $C_{60}$.

18. An article made of the superhard carbon material, according to claim 1.

19. An article made of the superhard carbon material, obtained by the method, according to claim 7.

* * * * *